United States Patent
Aoyagi et al.

(10) Patent No.: US 6,930,843 B2
(45) Date of Patent: Aug. 16, 2005

(54) DISK DRIVE

(75) Inventors: Yuka Aoyagi, Tachikawa (JP); Akihiko Takeo, Kunitachi (JP); Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 640 days.

(21) Appl. No.: 09/949,625

(22) Filed: Sep. 12, 2001

(65) Prior Publication Data

US 2002/0034029 A1 Mar. 21, 2002

(30) Foreign Application Priority Data

Sep. 21, 2000 (JP) ........................................ 2000-287390

(51) Int. Cl.$^7$ .............................................. G11B 21/02
(52) U.S. Cl. ......................................... 360/31; 360/75
(58) Field of Search ............................. 360/31, 46, 75, 360/77.08

(56) References Cited

U.S. PATENT DOCUMENTS

| | | | |
|---|---|---|---|
| 5,831,786 A | * 11/1998 | Boutaghou et al. | ........... 360/75 |
| 6,019,503 A | 2/2000 | Abraham et al. | |
| 6,172,836 B1 | * 1/2001 | Bang | ............................ 360/75 |
| 6,270,885 B1 | * 8/2001 | Hokkyo et al. | ............. 428/332 |
| 6,295,175 B1 | * 9/2001 | Tomita et al. | ................. 360/31 |

FOREIGN PATENT DOCUMENTS

| JP | 3-44809 | 2/1991 |
|---|---|---|
| JP | 4-137209 | 5/1992 |
| JP | 2000-90424 | 3/2000 |

OTHER PUBLICATIONS

JP11213525 A, Patent Abstracts of Japan, Aug. 6, 1999.

* cited by examiner

*Primary Examiner*—David Hudspeth
*Assistant Examiner*—Varsha A. Kapadia
(74) *Attorney, Agent, or Firm*—Pillsbury Winthrop, LLP

(57) ABSTRACT

There is disclosed a disk drive provided with a function of suspending a read/write operation in the case where the magnetic field of the magnetic disturbance out of the predetermined range is generated. The disk drive has a head writing data to the disk, a sensor detecting a magnetic field with respect to the disk drive, and an actuator unloading the head from the surface of the disk to a retracting position outside of the disk when the detected magnetic field is out of a predetermined range.

17 Claims, 5 Drawing Sheets

DISK DRIVE

CROSS-REFERENCE TO RELATED APPLICATIONS

This application is based upon and claims the benefit of priority from the prior Japanese Patent Application No. 2000-287390, filed Sep. 21, 2000, the entire contents of which are incorporated herein by reference.

BACKGROUND OF THE INVENTION

1. Field of the Invention

The present invention generally relates to a disk drive of a magnetic recording method, and in particular, a disk drive device provided with a function of avoiding malfunctions by a magnetic field of magnetic disturbance.

2. Description of the Related Art

In recent years, in the field of a disk drive of a magnetic recording method, a perpendicular magnetic recording method has been noted along with the development of a longitudinal magnetic recording method. In this perpendicular magnetic recording method, a practical use of the a disk drive using a double-layered disk is promoted as a magnetic recording medium in this perpendicular magnetic recording method.

The double-layered structure disk has a recording layer showing magnetic anisotropy in a perpendicular direction, a soft magnetic layer between the recording layer and a substrate. The soft magnetic layer has a so-called function of allowing a part of magnetic flux generated from a magnetic pole on one side of a head to pass therethrough to the other magnetic pole to support a recording operation of the head. The soft magnetic layer has a characteristic of being magnetized and returning to an original non-magnetized state, and is provided with a characteristic of a high sensitivity against an outside magnetic field.

From such characteristic, the soft magnetic layer is likely to be affected by the magnetic influence with the magnetic field of the magnetic disturbance in the case where magnetic disturbance is generated with respect to the disk drive. The possibility becomes high that the magnetic state of the recording layer of the disk unstably changes along with the magnetic change of this soft magnetic layer. In particular, when the magnetic disturbance with a strong magnetic field is generated at the time of the read/write operation, there is a high possibility that the record data written with a write head which is a magnetic head or the read data which is read with the read head changes. In the worst case, malfunctions of the read/write operation are invited, and erroneous data is recorded or read.

As described above, in particular, in a disk drive of the perpendicular magnetic recording method using the double-layered structure disk, a counter-measure for avoiding malfunctions of the read/write operation of the data by the magnetic field of the magnetic disturbance becomes indispensable.

Conventionally, there is proposed a technique in which a magnetic thin film for magnetic shield is provided on the protection film of the head is provided, and the influence of the magnetic disturbance to the disk is prevented (for example, see Jpn. Pat. Appln. KOKAI Publication No. 4-137209).

Furthermore, as a different proposal, there is available a method of reducing a magnetic permeability of the soft magnetic layer of the disk (for example, see Jpn. Pat. Appln. KOKAI Publication No. 2000-90424).

Furthermore, there is proposed a method of detecting a magnetic field of the magnetic disturbance and generating a magnetic field for correction for eliminating the magnetic field (for example, see Jpn. Pat. Appln. KOKAI Publication No. 3-44809).

BRIEF SUMMARY OF THE INVENTION

An object of the present invention is to provide a disk drive excellent in stability, and capable of avoiding malfunctions in the read/write operation of data resulting from magnetic disturbance exceeding a predetermined range.

According to an aspect of the present invention, there is provided a disk drive provided with a function of avoiding malfunctions of the read/write operation with the magnetic disturbance.

The disk drive comprises a disk, a head writing data to the disk; a sensor detecting a magnetic field with respect to the disk drive, and an actuator unloading the head from the surface of the disk to a retracting position outside of the disk when the detected magnetic field is out of a predetermined range.

According to the other aspect of the present invention, there is provided a disk drive of a perpendicular recording method, the drive having a double-layered disk and being provided with the facilities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Figure 1:
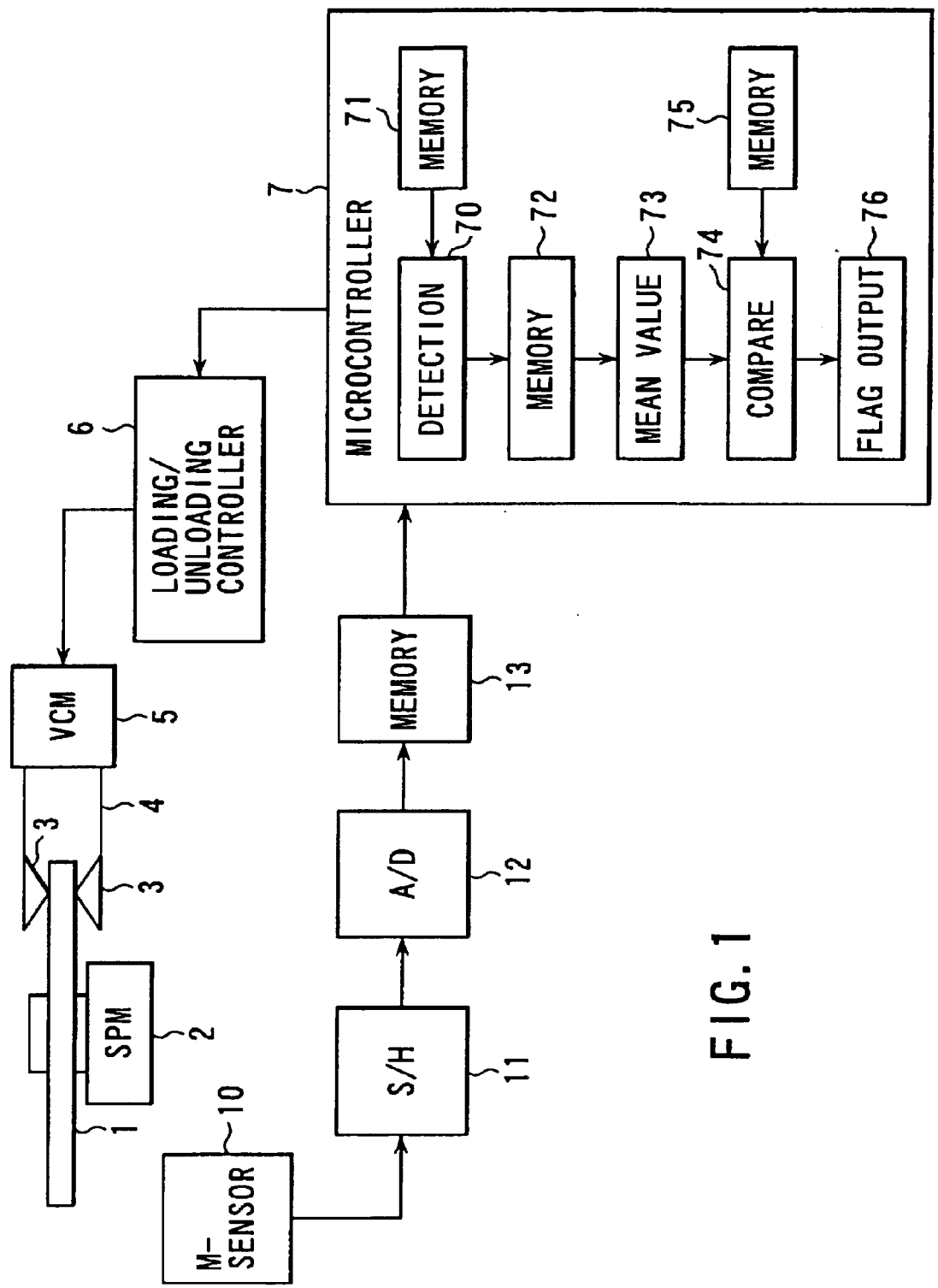
FIG. 1 is a block diagram showing an essential portion of a disk drive according to a first embodiment of the present invention.

Embodiments of the present invention will be explained by referring to the drawings.

(Structure of Disk Drive)

Figure 2:
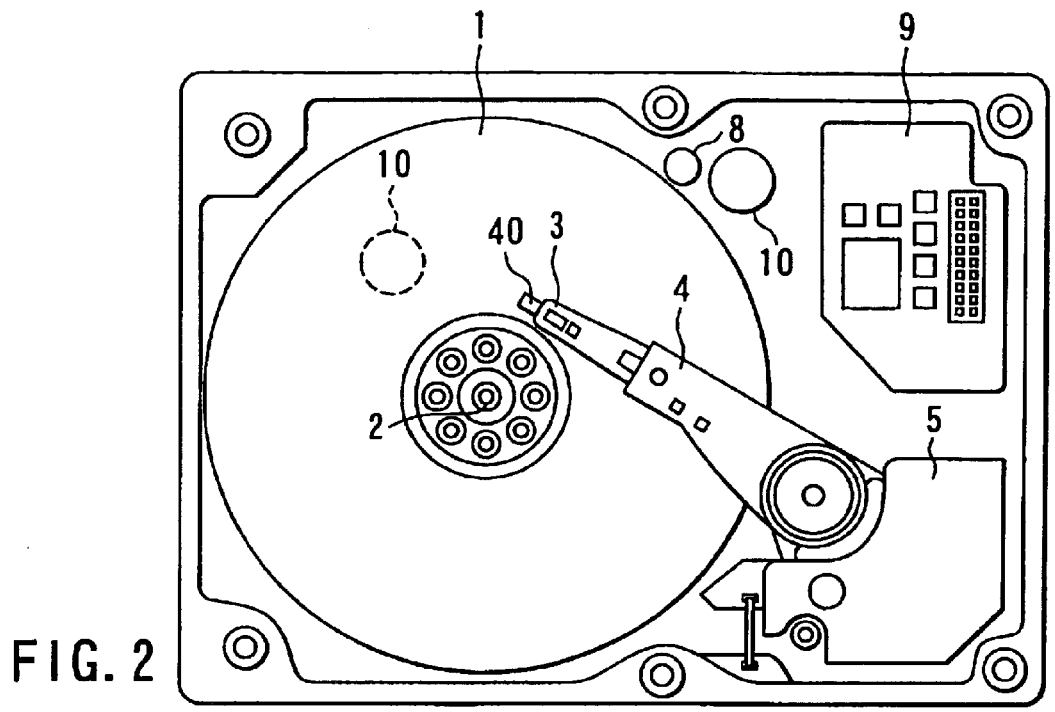
FIG. 2 is a view for explaining a mechanism of the disk drive according to the first embodiment.

FIG. 2 is a view for explaining a drive mechanism of a disk drive according to each of the embodiments described later.

The disk drive has a structure in which a drive mechanism comprising a disk 1, a spindle motor (SPM) 2 and an actuator is incorporated inside of a casing which is a drive body (an upper portion cover is omitted) as shown in FIG. 2 by assuming a perpendicular magnetic recording method.

The actuator comprises an arm 4 provided with a head 3, and a voice coil motor (VCM) for rotating and driving the arm 4 in a radial direction on the disk 1. The actuator conducts an unload operation for retracting head 3 up to a ramp member 8 arranged outside of the disk 1, and a load operation for moving the head 3 up to the surface of the disk 1. At the time of the read/write operation of data, the actuator is moved and controlled in a radial direction of the disk 1 to position the head 3 in a target position with the servo control of the micro controller which will be described below.

The head 3 has a structure in which a write head and a read head are mounted on a slider. At the end portion of the actuator, there is provided a member 40 for allowing the head 3 to ride over the ramp member 8 to park the head 3 at the time of the unload operation. Furthermore, on the drive body, there is provided a circuit board 9 on which various circuits such as a preamplifier circuit and the like are provided.

The disk 1 comprises a double-layered structure having a recording layer showing magnetic anisotropy in a perpendicular direction, and a soft magnetic layer between the recording layer and a substrate. Furthermore, on the recording layer of the disk 1, servo data is recorded in advance as described below. Furthermore, the disk 1 is attached on the spindle motor 2, and is rotated at a high speed at the time of the read/write operation.

(First Embodiment)

Hereinafter, referring to FIG. 2 together with FIGS. 1, 3, 4A and 4B, a first embodiment will be explained.

As shown in FIG. 2, a disk drive according to the first embodiment is provided with a magnetic sensor 10 in the vicinity of the disk 1. The magnetic sensor 10 comprises, for example, a Hall effect element and detects the magnetic field of the magnetic disturbance affecting the drive. For the magnetic sensor 10, a Hall effect element having a non-directivity which is capable of detecting the magnetic head of the magnetic disturbance from a multiple direction is desired. When a similar detection function is provided, other magnetic sensor device may be provided. Furthermore, the magnetic sensor 10 may be provided on an upper portion cover of the casing (not shown) (a position denoted with a dot line of FIG. 2). At this position, it is possible to detect the magnetic field of the magnetic disturbance affecting the perpendicular direction in particular with respect to the disk 1.

This embodiment is, as shown in FIG. 1, a disk drive provided with a micro controller 7 having a monitor function of the magnetic disturbance using the magnetic sensor 10, and a loading/unloading controller 6 for controlling a load/unload operation of the head 3.

The micro controller 7 is, specifically, a main controller of a drive comprising a micro processor (CPU) and a memory. The controller 7 realizes a monitor function with a program and data stored in the CPU and the memory. The micro controller 7 conducts each function (software) of a detection portion 70, a mean value calculation portion 73, a comparator 74 and a flag output portion 76 to conduct the monitor operation of the magnetic field of the magnetic disturbance.

The controller 7 inputs a detection value (digital value) of the magnetic field of the magnetic disturbance from a processing circuit system of the magnetic sensor 10 and conducts a monitor operation in a predetermined order. The processing circuit system comprises a sample hold circuit 11 for sampling an output value (a voltage value in accordance with the magnetic field of the magnetic disturbance) of the magnetic sensor 10 in a predetermined time interval, an A/D converter 12 and a memory (RAM) 13. The A/D converter 12 converts the sample held voltage value (a level value showing intensity of the magnetic field) into a digital value and stores the value in the memory 13.

The loading/unloading controller 6 includes a driver or the like for driving and controlling the VCM 5 of the head actuator with the control of the controller 7. The controller 6 conducts an unload operation for retracting the head 3 from the disk 1 and a load operation for moving the head 3 to the surface of the disk 1. In the unload operation, the head 3 moves to the ramp member 8 arranged outside of the disk 1. Specifically, the controller 6 comprises a VCM driver for driving the VCM 5, and a gate array for conducting the unload operation in accordance with the receipt of the flag sent from the flag output portion 76 of the CPU 7. Incidentally, the controller 6 may be a servo controller comprising a normal CPU and a gate array.

(Monitor Operation of Magnetic Disturbance and Unload Control)

Figure 4A:
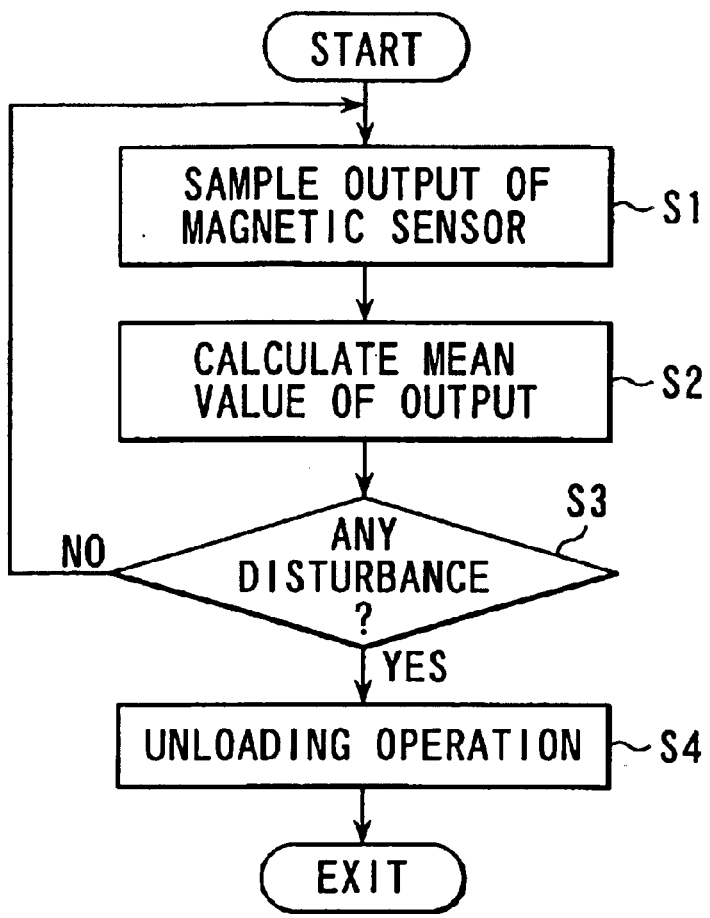
FIGS. 4A and 4B are flowcharts for explaining an operation according to the first embodiment.

Hereinafter, referring in particular to the flowchart of FIG. 4A together with FIG. 1, a monitor operation of the magnetic disturbance and an unload control of the embodiment will be explained by referring to the flowchart of FIG. 4A.

Immediately after the power-on of the disk drive, an output value of the magnetic sensor 10 is sampled and converted into a digital value followed by being stored in the memory 13 (step S1). The controller 7 inputs a detection value (digital value) of the magnetic field of the magnetic disturbance corresponding to the output value of the magnetic sensor 10 from the memory 13 and starts the monitor operation in a predetermined procedure.

In the beginning, the detection portion 70 of the controller 7 inputs a detection value (an output value of a sensor 10) stored in the memory 13, calculates a difference from the voltage value (digital value) corresponding to the intensity level of the known internal magnetic field stored in the memory (for example, flash EEPROM) 71 to determine a voltage value (that is, a level value of magnetic intensity) corresponding to the magnetic disturbance at that point of time. That is, inside of the disk drive, a low level magnetic field which is not included in the disturbance is generated. In order to detect the magnetic field including the inside magnetic field, the magnetic sensor 10 conducts calculation for determining the level value of the magnetic field of the magnetic disturbance excluding the level value of the inside magnetic field.

Figure 3:
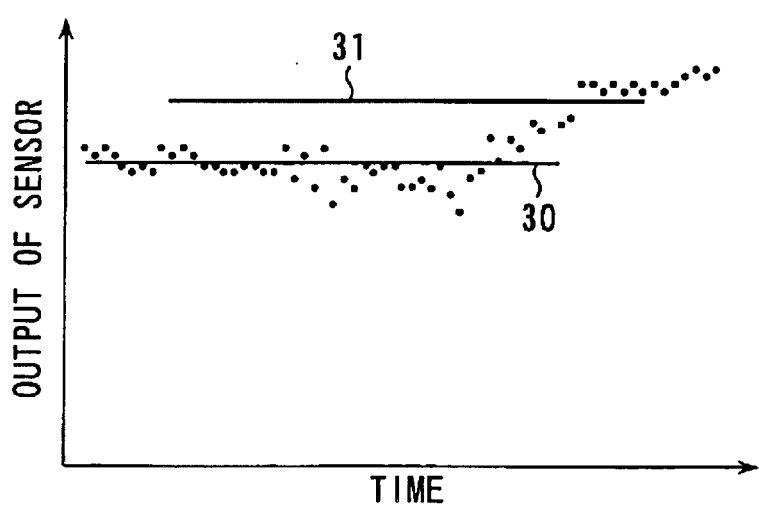
FIG. 3 is a view for explaining a judgment method of the magnetic disturbance according to the first embodiment.

Specifically, the detection portion 70 stores the calculation result for each of the predetermined time interval in the memory (RAM) 72. In the memory 72, as shown in FIG. 3, a detection value (an output value of the calculated sensor 10) shown with a black point which is plotted in accordance with the passage of time is stored. The level value 30 shown in FIG. 3 refers to a reference value inside of the predetermined range in the initial state. The level value 31 refers to a level value out of the predetermined range showing an increase on the order of about 10% from the reference level value 30.

Here, since the level value of the magnetic field of the magnetic disturbance changes, the mean value calculation portion 73 averages the detection value for five times detection operation to send the mean value data to the comparison portion 74 (step S2). The comparison portion 74 compares the reference level value 30 in the predetermined range in the initial state stored in the memory (for example, flash EEPROM) 75 with the mean value (step S3). The comparison portion 74 judges that the magnetic field of the magnetic disturbance out of the predetermined range is generated (YES of step S3) in the case where the detection value (an mean value of the level of the magnetic field of the magnetic disturbance) is a level value exceeding, for example, about 10% of the reference level value 30. The flag output portion 76 sends the notification flag to the controller 6 in accordance with the comparison result of the comparison portion 74.

When the controller 6 receives a notification flag from the micro controller 7, the VCM 5 is driven and controlled to move the head actuator to the side of the outer periphery of the disk 1 to conduct an unload operation for retracting the head 3 from the disk 1 (step S4).

When the head 3 conducts the read/write operation of data with a target cylinder on the disk 1 through the above monitor operation and the unload control, the controller 7 constantly monitors the generation of the magnetic field of the magnetic disturbance. Then, when it is judged that the magnetic field of the magnetic disturbance out of the predetermined range is generated, the controller 7 gives a notification for promoting the unload operation to the controller 6. Accordingly, the controller 6 drives and controls the actuator to forcibly unload the head 3 from the surface of the disk 1 up to the ramp member 8. Thus, the read/write operation of the head 3 is suspended and the head 3 is retracted from the disk 1. As a consequence, at the time of the read/write operation, such state as the recording of the erroneous data on the recording layer under the influence of the generation of the magnetic field of the magnetic disturbance, and the reading of the erroneous data from the recording layer can be avoided in advance.

Furthermore, in the monitor method according to the embodiment, in the generation of the magnetic field of the magnetic disturbance in the predetermined range, the read/write operation of data is not suspended and the read/write operation can be suspended only in the case out of the predetermined range. Consequently, it becomes possible to secure a secured read/write operation of the data in the perpendicular recording method without damaging the operation efficiency of the disk drive.

Incidentally, a structure may be such that the arrangement of the magnetic sensor 10 may be provided not only at one location but also at a plurality of locations in order to heighten a detection precision of the magnetic field of the magnetic disturbance. In this case, the controller 7 continuously monitors detection values from each sensor, and an instruction for the unload operation is given to the controller 6 when the detection value with any of the sensor is outside the predetermined range.

Figure 4B:
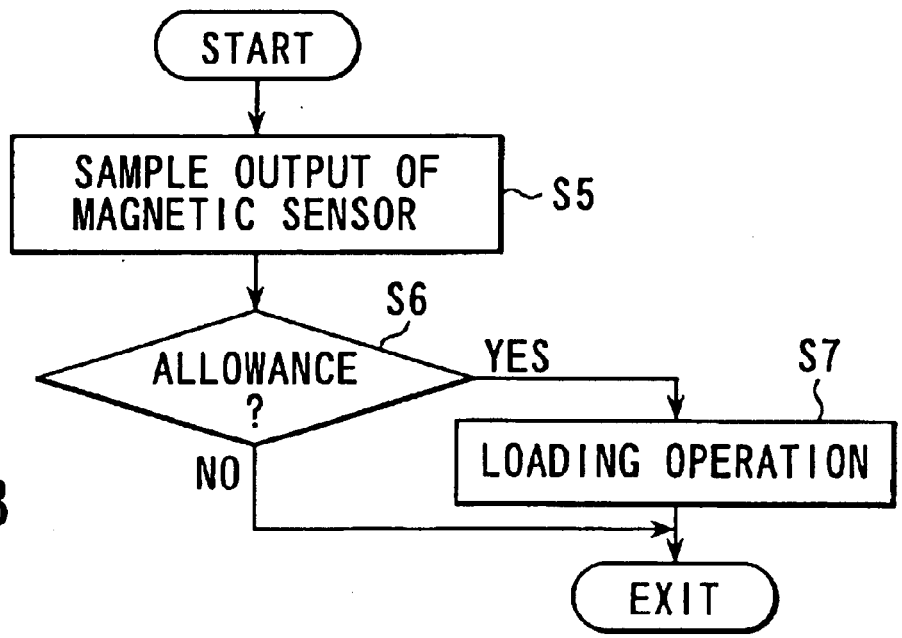

Furthermore, even after the head is retracted up to the ramp member 8 with a forcible unload operation, the controller 7 monitors the magnetic field of the magnetic disturbance as shown at step S5 of FIG. 4B. Then, in the case where it is judged that the magnetic field of the magnetic disturbance is lowered to the predetermined range, the controller 7 gives an instruction of the execution of the load operation to the controller 6 (YES of step S6). In accordance with the instruction, the controller 6 drives and controls the actuator to conduct a load operation of moving the head 3 to the surface of the disk 1 (step S7). As a consequence, when the magnetic disturbance changes up to the predetermined range, the read/write operation can be resumed.

(Second Embodiment)

Figure 5:
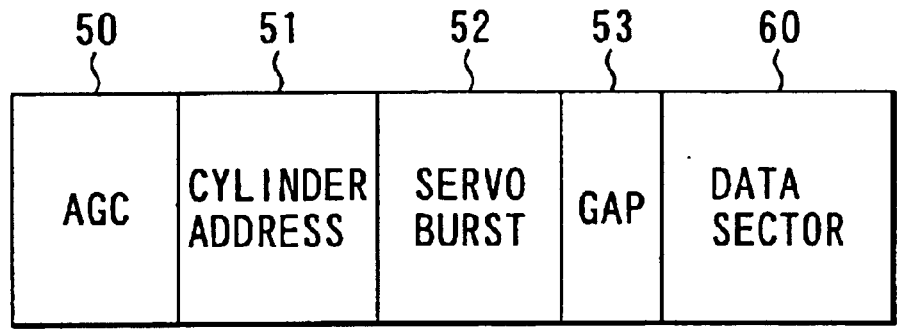
FIG. 5 is a view for explaining a signal pattern for monitoring the magnetic disturbance according to a second embodiment of the present invention.
Figure 7:
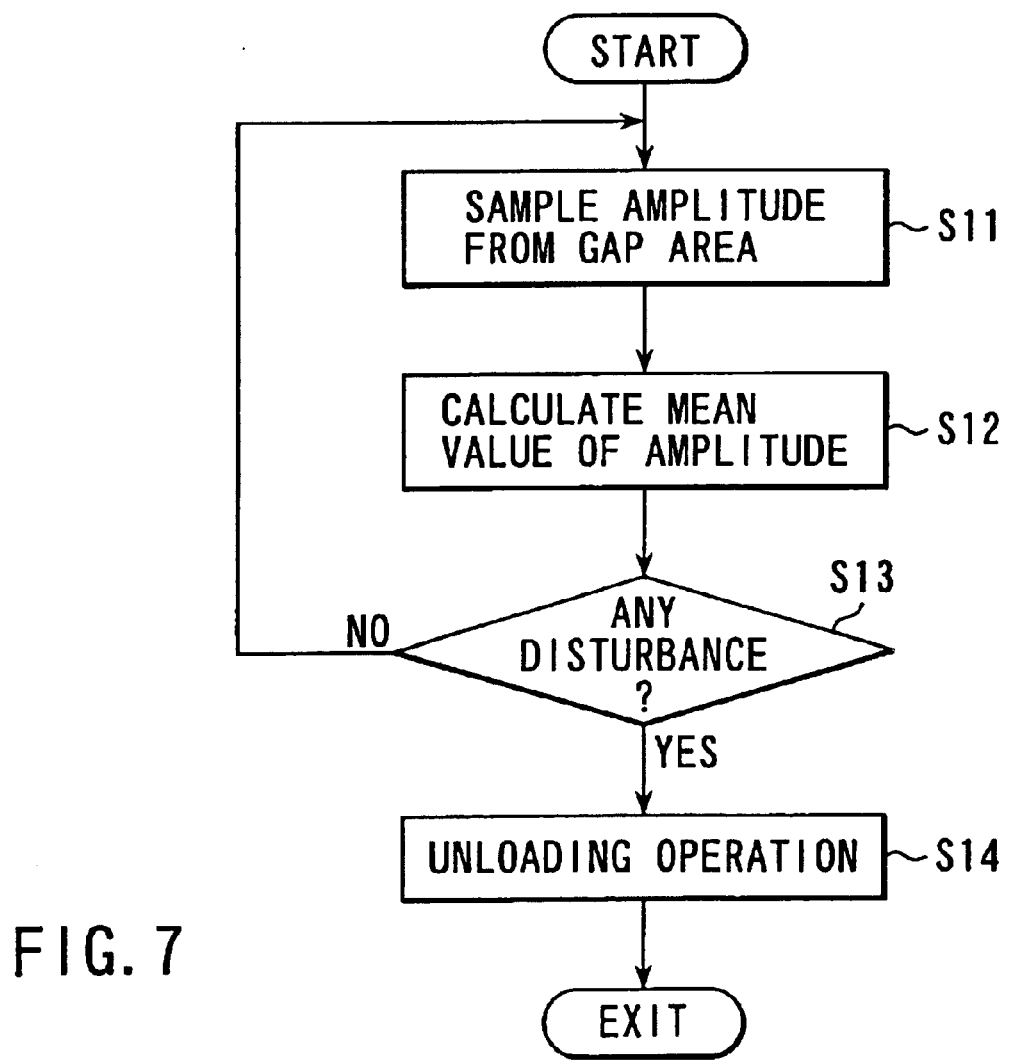
FIG. 7 is a flowchart for explaining an operation of the second embodiment.
Figure 6:
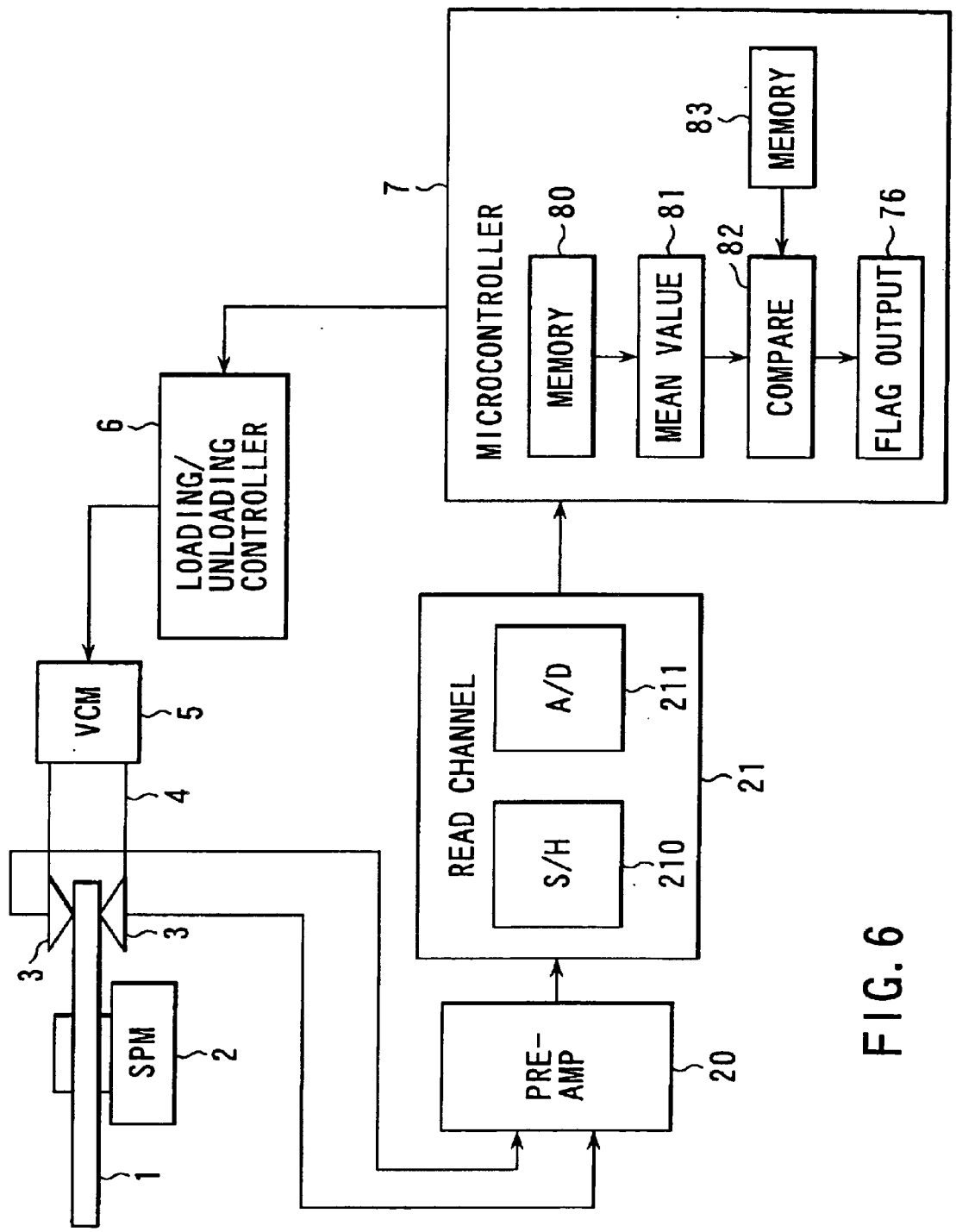
FIG. 6 is a block diagram showing an essential portion of the disk drive according to the second embodiment.

FIGS. 5, 6 and 7 are views associated with the second embodiment. The second embodiment has a structure in which a monitor operation of the magnetic field of the magnetic disturbance is realized without using the magnetic sensor 10. The second embodiment will be specifically explained hereinbelow.

The controller 7 according to the second embodiment stores an amplitude value (a digital value) corresponding to a specific signal pattern in the read signal read with the head (read head) 3 as a detection value of the magnetic field of the magnetic disturbance in a memory (RAM) 80 (step S1). Here, the specific signal pattern refers to a signal read with the read head from a gap portion 53 included in a servo area provided on a disk 1 as shown in FIG. 5.

By the way, as described above, in the disk drive, the controller 7 conducts a servo control for positioning the head 3 on the target position (target cylinder) on the disk 1 as a previous stage of the read/write operation. The controller 7 conducts the servo control by using a servo data read with the read head.

As shown in FIG. 6, at the time of the servo control operation, the read head (included in the head 3) reads the servo signal from the servo area and sends the signal to the preamplifier 20. The preamplifier 20 amplifies the servo signal to send the signal to the read channel 21. The read channel 21 has a sample hold circuit 210 and an A/D converter 211 to conduct the reproduction processing of the sampled servo signal to send the reproduced servo data to the controller 7.

By the way, in the servo area, as shown in FIG. 5, a cylinder address 51 for identifying an AGC pattern 50 and a cylinder, and servo burst data 52 used for the track following operation of the head 3 are recorded. The servo area is arranged a predetermined interval of a plurality of cylinders which are constituted in a concentric manner on the disk 1. Each cylinder is constituted in such a manner that a plurality of data sectors 60 are arranged between servo areas.

The gap portion 53 is arranged between the servo area and the data sector 60. The gap portion 53 is an area for time adjustment arranged between the backmost portion of the serve area and the front portion of the data sector. Normally, a high frequency bit pattern (also referred to as all-one pattern) is recorded.

In the controller 7, the mean value calculation portion 81 averages the amplitude value stored in the memory 80 to send the mean value data to the comparison portion 82 (step S12) in order to absorb the detection change of the amplitude value. The comparator 82 compares the reference value stored in the memory 83 with the mean value to judge the generation of the magnetic field of the magnetic disturbance (step S13). Specifically, in the case where the increase or decrease amount with respect to the reference value (for example, the amplitude value in the predetermined range in the initial state) exceeds, for example, about 10%, the comparison portion 82 judges that the magnetic field of the magnetic disturbance out of the predetermined range is generated (YES of step S13). Here, in accordance with the direction of the magnetic flux of the magnetic field of the magnetic disturbance, the amplitude value of the specific signal pattern is increased or decreased from the reference value.

When the controller 7 judges that the magnetic field of the magnetic disturbance out of the predetermined range is generated, a notification flag is sent from the flag output portion 76 to the controller 6. Accordingly, the controller 6 drives and controls the actuator to conduct an unload operation for retracting the head 3 from above the disk 1 to the ramp member 8 (step S14).

Furthermore, in a forcible unload operation, even after the head 3 is retracted up to the ramp member 8, the controller 7 monitors the magnetic disturbance as described above. Then, in the case where it is judged that the magnetic disturbance has been lowered to a predetermined range, the controller 7 gives an instruction of the execution of the load operation to the controller 6. In accordance with this instruction, the controller 6 drives and controls the actuator to conduct a load operation for moving the head 3 from the ramp member 8 up to the surface of the disk 1. As a consequence, when the magnetic head moves up to the predetermined range, the read/write operation can be resumed.

As has been described above, according to the embodiment, the generation of the magnetic field of the magnetic disturbance out of the predetermined range can be monitored by detecting an increase or decrease amount of the amplitude value of a specific signal pattern. In the monitor method according to the present invention, since the generation of the magnetic head of the magnetic disturbance can be detected in accordance with the change in the signal amplitude value from the servo area arranged on all the cylinders on the disk 1, the monitor can be realized approximately over the whole range of the disk 1.

Incidentally, the embodiment has a structure in which a change in the increase and decrease value of the amplitude value of the specific signal pattern recorded in the gap portion 53 is used. However, the embodiment is not restricted thereto. Incidentally, a method may be used in which specific data for the monitor for the magnetic field of the magnetic disturbance is recorded in advance, and the generation of the magnetic field of the magnetic disturbance is judged with the change detection of the amplitude value at the time when the controller 7 reproduces the specific data.

In summary, in the case where the magnetic field of the magnetic disturbance out of the predetermined range is generated while monitoring the magnetic field of the magnetic disturbance affecting the disk drive, the head can be forcibly retracted from the disk. Consequently, malfunctions can be avoided for reading and writing erroneous data under the influence of the magnetic field of the magnetic disturbance out of the predetermined range at the time of reading and writing data.

In particular, when applied to a perpendicular recording method disk drive which uses a double-layered disk which is easily affected by he magnetic disturbance, the embodiment is very effective. As a consequence, it becomes possible to provide a disk drive of the perpendicular recording method excellent in stability with respect to the magnetic field of the magnetic disturbance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive for writing to a disk, comprising:
    a head configured to write data to the disk;
    a sensor configured to detect a magnetic field of a magnetic disturbance with respect to the disk drive; and
    an actuator configured to unload the head from the surface of the disk to a retracting position outside of the disk when the detected magnetic field is out of a predetermined range.

2. The disk drive according to claim 1, wherein the disk is recorded with a perpendicular magnetic recording method.

3. The disk drive according to claim 2, wherein the disk comprises a recording layer showing magnetic anisotropy in a perpendicular direction and a soft magnetic layer provided between the recording layer and a substrate.

4. The disk drive according to claim 1, wherein the magnetic sensor comprises a sensor using a Hall effect element.

5. The disk drive according to claim 1, further comprising:
    a controller monitoring an output value from the sensor indicating the detected magnetic field, wherein the controller notifies the actuator to unload the head when the output value is out of a predetermined value.

6. The disk drive according to claim 1, further comprising:
    a memory storing a predetermined value; and
    a controller calculating a mean value of an output value from the sensor monitored at a predetermined time interval, wherein the controller notifies the actuator to unload the head when the calculated value is larger than the predetermined value.

7. The disk drive according to claim 1, wherein the retracting position is a position for parking the magnetic head with a ramp member which is arranged outside of the disk.

8. The disk drive according to claim 1, wherein the actuator loads the head onto the surface of the disk from the retracting position when the detected magnetic field by the sensor comes within the predetermined range.

9. The disk drive according to claim 1, wherein the actuator stops loading the head to the surface of the disk from the retracting position when the detected magnetic field is out of a predetermined range.

10. A disk drive for reading from a disk comprising:
    a head configured to read data from the disk;
    a controller configured to monitor an amplitude value of a predetermined signal pattern read by the head from the disk and to determine whether a magnetic field is out of a predetermined range based on the amplitude value; and
    an actuator configured to unload the head from a surface of the disk to a retracting position outside of the disk when the detected magnetic field is out of a predetermined range.

11. The disk drive according to claim 10, wherein the predetermined signal pattern is a signal pattern recorded on a gap portion provided at a boundary portion between a servo area and a data sector on the disk.

12. The disk drive according to claim 10, wherein the disk is recorded with a perpendicular magnetic recording method.

13. The disk drive according to claim 12, wherein the disk comprises a recording layer showing magnetic anisotropy in a perpendicular direction, and a soft magnetic layer provided between the recording medium and a substrate.

14. The disk drive according to claim 10, further comprising:
    a memory configured to store a predetermined value; and
    a controller configured to calculate a mean value of an output value from a sensor that detects the magnetic field and is monitored at a predetermined time interval, wherein the controller notifies the actuator to unload the head when the calculated value is larger than the predetermined value.

15. The disk drive according to claim 10, wherein the retracting position is a position for parking the magnetic head with the ramp member arranged outside of the disk.

16. The disk drive according to claim 10, wherein the monitor controller drives and controls the actuator when the magnetic field comes within the predetermined range and provides an instruction to load the magnetic head from the retracting position to the surface of the disk.

17. A method for controlling a disk drive comprising:

loading a magnetic head on a disk;

detecting a magnetic field of a magnetic disturbance relative to the disk drive;

unloading the magnetic head from the disk to a retracting position out of the disk when the detected magnetic field is out of the predetermined range.

* * * * *

UNITED STATES PATENT AND TRADEMARK OFFICE
CERTIFICATE OF CORRECTION

| | | |
|---|---|---|
| PATENT NO. | : 6,930,843 B2 | Page 1 of 1 |
| APPLICATION NO. | : 09/949625 | |
| DATED | : August 16, 2005 | |
| INVENTOR(S) | : Yuka Aoyagi et al. | |

It is certified that error appears in the above-identified patent and that said Letters Patent is hereby corrected as shown below:

One title page, item 56, References Cited under Foreign Patent Document
Please add -- German Reference DE 32 15 821 A1 11/1982* * * --

Signed and Sealed this

Nineteenth Day of September, 2006

JON W. DUDAS
*Director of the United States Patent and Trademark Office*